United States Patent [19]

McCrory

[11] 4,422,257
[45] Dec. 27, 1983

[54] CARROUSEL WILDFOWL DECOY

[76] Inventor: Roy E. McCrory, 4044 Bishops Bridge Rd., Memphis, Tenn. 38118

[21] Appl. No.: 333,015

[22] Filed: Dec. 21, 1981

[51] Int. Cl.³ .............................................. A01M 31/06
[52] U.S. Cl. ......................................... 43/3; 46/123; 272/31 R
[58] Field of Search ............................. 43/3, 2, 26.1; 272/31 R; 46/107, 104, 92, 123

[56] References Cited

U.S. PATENT DOCUMENTS

| 1,376,282 | 4/1921 | Kauffman | 43/3 |
| 2,547,286 | 4/1951 | Sabin | 43/3 |
| 2,616,200 | 11/1952 | Milam | 43/3 |
| 3,016,647 | 1/1962 | Peterson et al. | 43/3 |
| 3,984,105 | 10/1976 | Breslow | 272/31 R |
| 4,322,908 | 4/1982 | McCrory | 43/3 |

FOREIGN PATENT DOCUMENTS 91504 2/1938 Sweden ..................................... 43/3

Primary Examiner—Gene P. Crosby

[57] ABSTRACT

An array of hollow body wildfowl decoys operatively connected each to the others in a carrousel type configuration such that a plurality of auxiliary decoys are pulled around a central control decoy in which is housed electromechanical means for such accomplishment. Movements of auxiliary decoys are characterized by intermittent starts, stops, and direction changes to give the array lifelike appearance.

9 Claims, 6 Drawing Figures

ELECTRIC CIRCUIT 23

CARROUSEL WILDFOWL DECOY

BRIEF SUMMARY

The carrousel wildfowl decoy herein described is an invention comprising a plurality of hollow body wildfowl decoy elements formed in the image of ducks, geese, or other wildfowl, operatively connected together to form a wildfowl decoy array which can be electromechanically maintained in lifelike motion for sustained periods of time. The moving array is accomplished by use of a plurality of auxiliary decoy elements which move in response to electromechanical means housed in a control decoy element, said electromechanical means, utilizing an electric circuit means to include a re-chargeable battery and an electric motor, rotates suspension means which pulls operatively attached auxiliary decoy elements so thay revolve about control decoy element. The control decoy element is stationary with respect to auxiliary decoy elements moving therearound while the array as a whole is mobile with respect to the surface upon which it is situated. Operation of the system is adaptable to water or hard surface and its nature renders it resistive to natural environmental impediments.

Accordingly, the following embodiment is to be considered illustrative rather than restrictive of the invention, and those modifications which come within the meaning and range of equivalency of these specifications and appended claims are included.

DESCRIPTION OF THE PREFERRED EMBODIMENT

Figure 1:
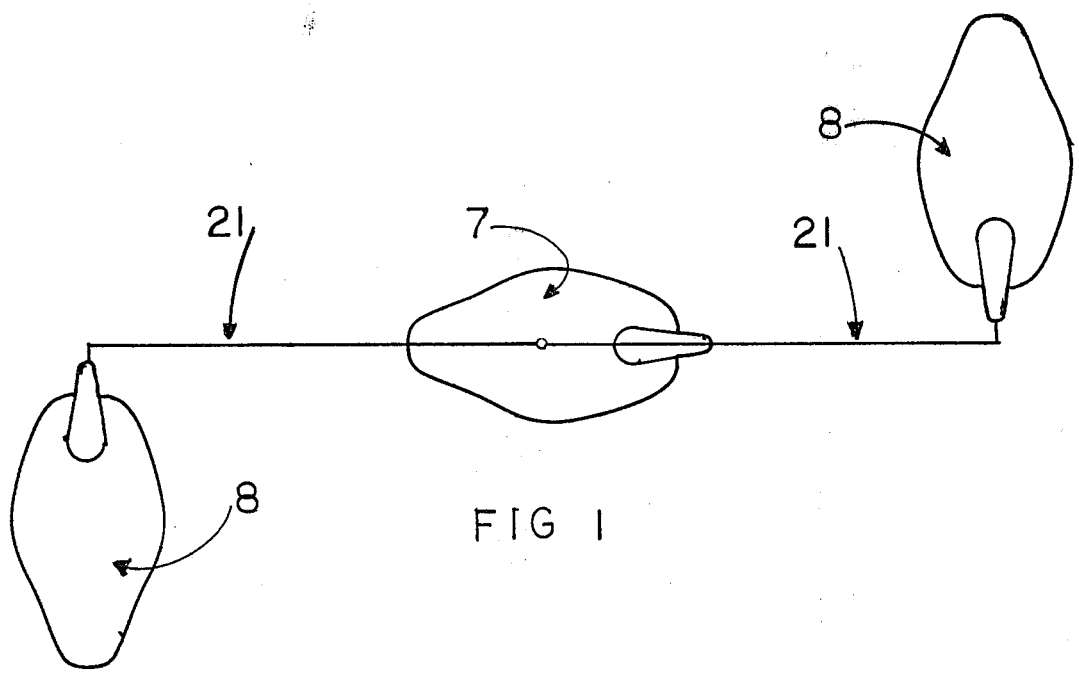
FIG. 1 is a top plan view illustrating the carrousel wildfowl decoy array in its operative position with two auxiliary decoy elements attached by suspension rod means to center control decoy element.
Figure 2:
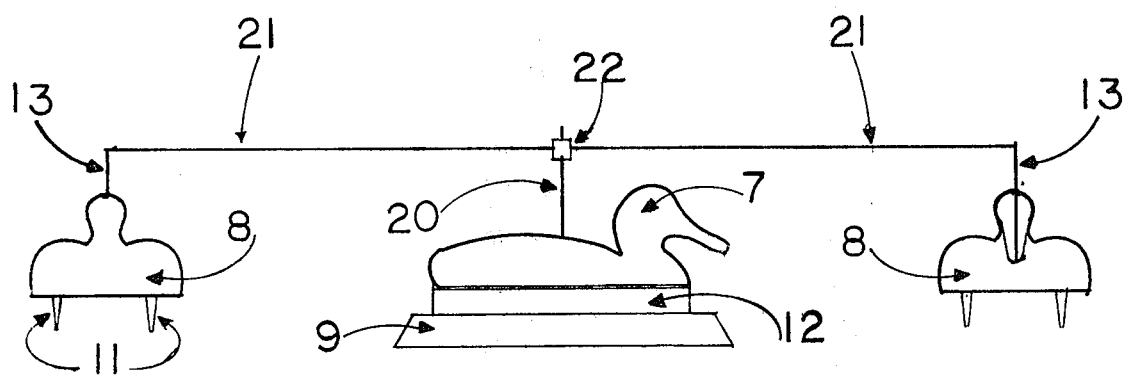
FIG. 2 is a elevational view illustrating the carrousel wildfowl decoy array in its operative position with a center control decoy element and attached suspension rod means shown in side elevational view, and two operatively attached auxiliary decoy elements shown in end elevational view.
Figure 3:
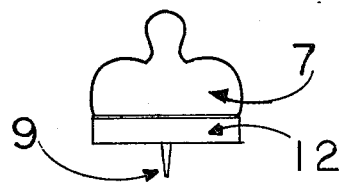
FIG. 3 is a partial and sectional view of a control decoy element including bottom flotation platform with anchor means affixed.
Figure 4:
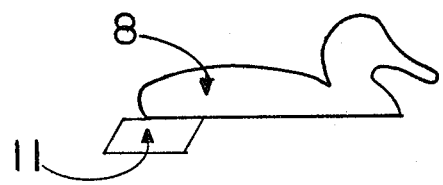
FIG. 4 is a partial side elevational view of a auxiliary decoy element including twin rudders attached to bottom.
Figure 5:
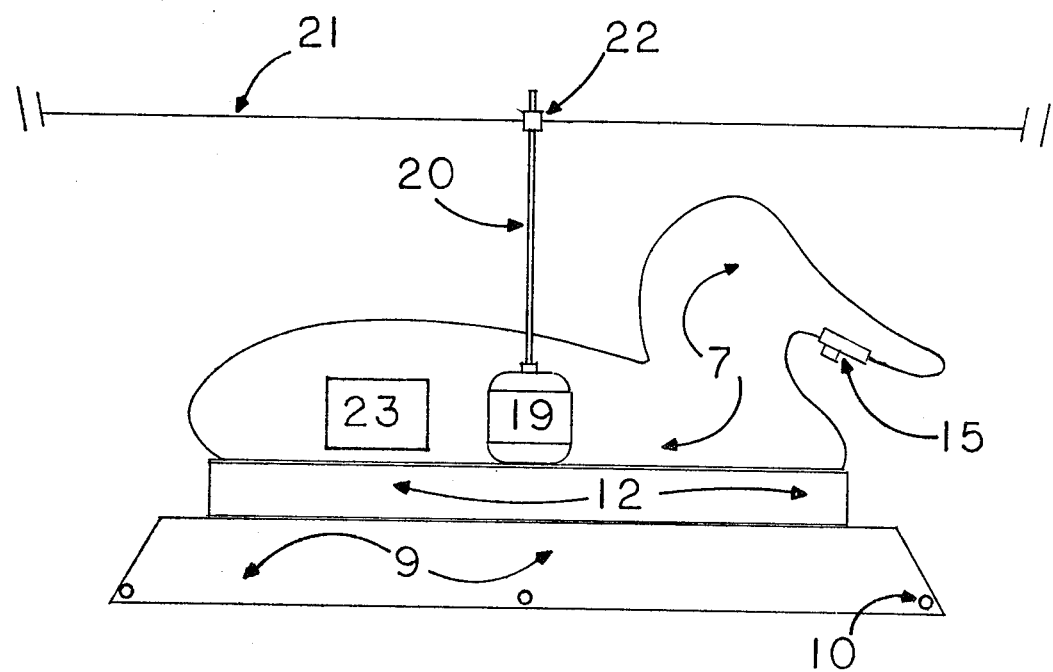
FIG. 5 is a partial vertical longitudinal sectional elevation of a control decoy element of the present invention illustrating presence of pertinent elements therein, with omission of auxiliary decoy elements, which are adequately illustrated in FIGS. 1, 2, and 4.
Figure 6:
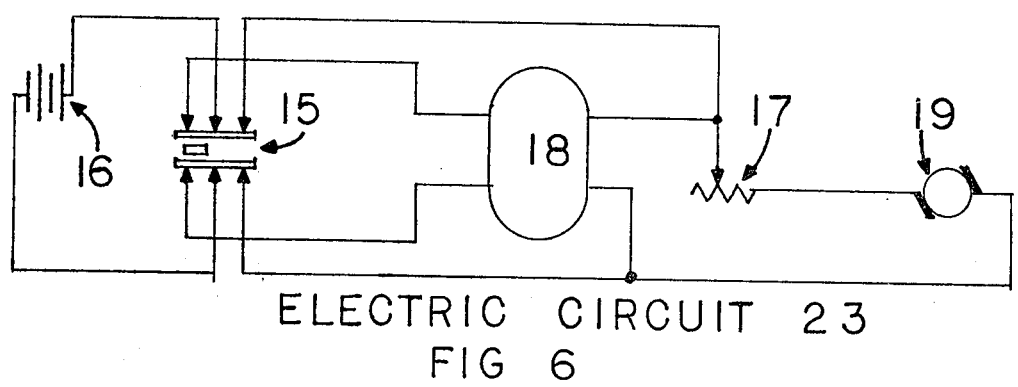
FIG. 6 is a partial schematic and partial diagrammatical view of the electric circuit of the present invention.

Illustrated by way of example only in FIGS. 1, 2, 3, 4, 5, and 6 is a preferred embodiment of the instant invention where it will be seen that there is a plurality of wildfowl decoy elements of hollow body construction, which may be in the form of ducks, geese, or the like, comprising a control decoy element which utilizes power means and suspension means to attach and control movement of a variable quantity of auxiliary decoy elements. Power means comprises an electric circuit, including re-chargeable battery, to power a motor which is operatively connected to suspension means. Suspension means comprises any common or well known expedient, such as suspension rods as illustrated in the drawings, which render operationally attached auxiliary decoy elements responsive to motor.

The main purpose of this invention is to provide a carrousel wildfowl decoy to include means for sustained and efficient operation and to feature means for electronic control of auxiliary decoy element movements to regulate their speed, stops and starts, and travel direction, including quick direction reversal.

A further purpose is to provide said carrousel wildfowl decoy to be durable and to operate reliably and stably. The preferred embodiment herein set forth, being oriented for operation upon water, has the control decoy element provided with a bottom flotation platform means constructed of a solid mass of lightweight low density material with anchor means fixedly attached to bottom thereof to prevent rotation during operation. The hollow body portion of control decoy is formed in the image of a duck, goose, or other wildfowl, and is detachably affixed upon bottom flotation platform means. Auxiliary decoy elements are of floatable hollow body construction and formed in the image of a duck, goose, or other wildfowl. For directional control each has rudder means attached to bottom thereof, which rudder alignment, relative to direction of travel, creates yaw to affect radius of travel, or effects quick and positive turnaround upon direction reversal.

OPERATION OF THE PREFERRED EMBODIMENT

For the foregoing purposes there is provided a plurality of hollow body wildfowl decoy elements formed in the image of ducks, geese, or the like, comprising a control decoy element 7 equipped with a motor 19 having fixedly attached to shaft thereof a shaft extension rod 20 which has fixedly attached thereupon a suspension rod connector 22, to which connector there is fixedly attached any convenient or desirable plurality of suspension rods 21 which fan out horizontally from control decoy element 7 a distance to facilitate swivel attachment thereto of a length of tether line 13 to which is attached auxiliary decoy elements 8. To provide flotation for control decoy element 7 there is provided detachably affixed to bottom of its hollow body a flotation platform 12 composed of a solid mass of lightweight low density material, or, if desired, other water-tight hollow body construction. To provide anchoring or non-rotating stability for control decoy element 7 there is fixedly attached to bottom of flotation platform 12 anchor means 9, with line attachment holes 10, designed such that water resistance to rotational movement of anchor means 9 prevents control decoy element 7 from rotating during operation, or if elected, other common or well known extrinsic towing, moving, anchoring or tethering expedients may be employed by attachment at holes 10. To provide flotation for auxiliary decoy elements 8 there is provided a watertight hollow body. To provide steering, stability and turnaround for auxiliary decoy elements 8 there is provided fixedly attached or adjustably attached to the bottom of each one or more rudders 11, or the like. To provide electrical drive current to motor 19 there is provided an electric circuit 23 with interfaced re-chargeable battery 16, slide switch 15, potentiometer 17, and a state-of-the-art automatic solid state electronic timing and current polarity reversal control element 18.

No attempt has been made herein to provide complete structural details by means of which the control decoy element, including its sub-assemblies, the auxiliary decoy elements, or the suspension means, either in whole or in part, for replacement or adjustment of a part or of the elements, can be assembled or disassembled, since such expedients are common and well known and have no bearing on the invention as herein presented. It will be appreciated that in some instances certain of the sub-assemblies or mechanisms herein described could be omitted and the invention could operate with only a part of the previously described structure and functions incorporated therein.

From the foregoing it will be apparent to those skilled in the art that a unique and improved electromechanically propelled carrousel wildfowl decoy array is provided by the present invention and that the objects of the invention are fulfilled. It will be further apparent that while a preferred embodiment of the invention has been shown and described, changes can be made without departing from the principals and spirit of the invention, the scope of which is defined in the following claims. For example, should it be desired to operate on land as opposed to water, then simply by equipping with wheels, skids, or the like, the carrousel wildfowl decoy array readily becomes land operable.

Accordingly, I claim:

1. A carrousel wildfowl decoy comprising an array of auxiliary wildfowl decoy elements of hollow body construction, formed in the image of a duck, goose, or other wildfowl and, by suspension means, operatively connected to each other, also featuring as an element of the decoy a control decoy element similarily imaged, housing therein an electric circuit, said circuit including a battery and a motor, and means attached to said battery and motor for operatively connecting and pulling the array of auxiliary decoy elements to revolve around the control decoy element.

2. The carrousel wildfowl decoy of claim 1 wherein the battery is re-chargeable.

3. The carrousel wildfowl decoy of claim 1 wherein the electric circuit includes timer means for providing intermittent starts and stops to increase lifelike movements.

4. The carrousel wildfowl decoy of claim 1 wherein the electric circuit includes electronic control means for reversing rotation of the motor and the direction of movement of the auxiliary decoy elements operatively connected thereto.

5. The carrousel wildfowl decoy of claim 1 wherein the electric circuit includes electronic control means for varying speed of the motor and to thereby vary speed of the auxiliary decoy elements operatively connected thereto.

6. The carrousel wildfowl decoy of claim 1 wherein the bottom of the control decoy element is a flotation platform made from a solid mass of low density flotation material.

7. The carrousel wildfowl decoy of claim 1 wherein the control decoy element includes anchor means fixedly attached to the bottom thereof with means to prevent rotation.

8. The carrousel wildfowl decoy of claim 1 wherein auxiliary decoy elements include fixedly attached to the bottom of each a rudder means angularly disposed to the line of travel to create yaw and to control radius of circle of their travel.

9. The carrousel wildfowl decoy of claim 1 wherein the auxiliary decoy elements include fixedly attached to the bottom of each a rudder means aligned with line of travel to provide stability and quick and effective turnaround upon reversal of direction of travel.

* * * * *